US010902842B2

(12) United States Patent
Corelli et al.

(10) Patent No.: US 10,902,842 B2
(45) Date of Patent: *Jan. 26, 2021

(54) SYSTEM AND METHOD FOR COGNITIVE INTERVENTION ON HUMAN INTERACTIONS

(71) Applicant: INTERNATIONAL BUSINESS MACHINES CORPORATION, Armonk, NY (US)

(72) Inventors: Helena Morgado Corelli, São Paulo (BR); Rodrigo Braga Fernandes, São Paulo (BR); Rodrigo Laiola Guimaraes, Bento Ferreira (BR); Rafael Sorana de Matos, Osasco (BR); Julio Nogima, São Paulo (BR); Rogerio Cesar Barbosa Dos Santos Silva, São Paulo (BR); Thiago Luiz de Barcelos Vital, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/256,689

(22) Filed: Jan. 24, 2019

(65) Prior Publication Data

US 2019/0156815 A1    May 23, 2019

Related U.S. Application Data

(63) Continuation of application No. 15/398,029, filed on Jan. 4, 2017, now Pat. No. 10,235,990.

(51) Int. Cl.
*G10L 15/02* (2006.01)
*G10L 15/22* (2006.01)
*G10L 25/63* (2013.01)

(52) U.S. Cl.
CPC ............. *G10L 15/02* (2013.01); *G10L 15/22* (2013.01); *G10L 15/222* (2013.01); *G10L 25/63* (2013.01); *G10L 2015/227* (2013.01)

(58) Field of Classification Search
CPC ... G10L 25/63; G10L 15/02; G10L 2015/088; G10L 15/1822
See application file for complete search history.

(56) References Cited

U.S. PATENT DOCUMENTS

| 4,449,189 A | 5/1984 | Feix et al. |
| 5,357,427 A * | 10/1994 | Langen ............... G06F 19/3418 |
| | | 600/300 |

(Continued)

FOREIGN PATENT DOCUMENTS

| CN | 101604204 A | 12/2009 |
| EP | 0082304 A1 | 6/1983 |

(Continued)

OTHER PUBLICATIONS

Joshi, "Real-time Document Recommendations Based on User Conversation", International Journal of Innovative Research in Computer and Communications Engineering, Feb. 2016, vol. 4, Issue 2, pp. 2531-2537.

(Continued)

*Primary Examiner* — Steve Rowland
(74) *Attorney, Agent, or Firm* — Kulsoom Hasan

(57) ABSTRACT

A determination regarding whether to intervene in a dialog to provide system-initiated assistive information involves monitoring a dialog between at least two participants and capturing data from a dialog environment containing at least one of the participants. The captured data represent the content of the dialog and physiological data for one or more participants. Assistive information relevant to the dialog and participants is identified, and the captured data are used to determine an intervention index of delivering the assistive (Continued)

information to one or more participants during the dialog. This intervention index is then used to determine whether or not to intervene in the dialog to deliver the assistive information to one or more participants.

19 Claims, 5 Drawing Sheets

(56) References Cited

U.S. PATENT DOCUMENTS

| | | | |
|---|---|---|---|
| 5,621,790 | A | 4/1997 | Grossman et al. |
| 5,694,523 | A | 12/1997 | Wical |
| 5,708,822 | A | 1/1998 | Wical |
| 5,864,815 | A | 1/1999 | Rozak et al. |
| 6,246,990 | B1 | 6/2001 | Happ |
| 6,356,869 | B1 | 3/2002 | Chapados et al. |
| 6,496,799 | B1 | 12/2002 | Pickering |
| 6,941,266 | B1 | 9/2005 | Gorin et al. |
| 7,058,208 | B2 | 6/2006 | Chang et al. |
| 7,058,565 | B2 | 6/2006 | Gusler et al. |
| 7,069,220 | B2 | 6/2006 | Coffman et al. |
| 7,167,824 | B2 | 1/2007 | Kallulli |
| 7,228,278 | B2 | 6/2007 | Nguyen et al. |
| 7,257,537 | B2 | 8/2007 | Ross et al. |
| 7,319,992 | B2 | 1/2008 | Gaos |
| 7,577,244 | B2 | 8/2009 | Taschereau |
| 7,603,273 | B2 | 10/2009 | Poirier |
| 7,751,597 | B2 | 7/2010 | Gabara |
| 7,809,569 | B2 | 10/2010 | Attwater et al. |
| 7,930,183 | B2 | 4/2011 | Odell et al. |
| 8,006,261 | B1 | 8/2011 | Haberman et al. |
| 8,073,681 | B2 | 12/2011 | Baldwin et al. |
| 8,140,335 | B2 | 3/2012 | Kennewick et al. |
| 8,326,627 | B2 | 12/2012 | Kennewick et al. |
| 8,903,940 | B2 | 12/2014 | Martin et al. |
| 9,070,357 | B1* | 6/2015 | Kennedy ................ G06Q 50/22 |
| 9,105,047 | B1 | 8/2015 | Curran et al. |
| 9,349,100 | B2 | 5/2016 | Kozloski et al. |
| 2002/0040297 | A1 | 4/2002 | Tsiao et al. |
| 2002/0133404 | A1 | 9/2002 | Pedersen |
| 2002/0178005 | A1 | 11/2002 | Dusan et al. |
| 2003/0078972 | A1* | 4/2003 | Tapissier ............ H04N 21/4532 709/204 |
| 2003/0091163 | A1 | 5/2003 | Attwater et al. |
| 2003/0125954 | A1 | 7/2003 | Bradley et al. |
| 2003/0149561 | A1 | 8/2003 | Zhou |
| 2004/0056907 | A1 | 3/2004 | Sharma et al. |
| 2004/0095389 | A1 | 5/2004 | Sidner et al. |
| 2004/0172252 | A1 | 9/2004 | Aoki et al. |
| 2004/0183829 | A1 | 9/2004 | Kontny et al. |
| 2005/0075878 | A1 | 4/2005 | Balchandran et al. |
| 2005/0135571 | A1 | 6/2005 | Bangalore et al. |
| 2005/0182625 | A1 | 8/2005 | Azara et al. |
| 2005/0246165 | A1 | 11/2005 | Pettinelli et al. |
| 2006/0074670 | A1 | 4/2006 | Weng et al. |
| 2006/0122834 | A1 | 6/2006 | Bennett |
| 2006/0149544 | A1 | 7/2006 | Hakkani-Tur et al. |
| 2006/0206332 | A1 | 9/2006 | Paek et al. |
| 2006/0271408 | A1* | 11/2006 | Rosenfeld ............ A61B 5/412 705/3 |
| 2007/0106127 | A1* | 5/2007 | Alman .................. G16H 40/67 600/300 |
| 2007/0285505 | A1 | 12/2007 | Korneliussen |
| 2008/0004881 | A1 | 1/2008 | Attwater et al. |
| 2008/0052080 | A1 | 2/2008 | Narayanan |
| 2008/0114837 | A1* | 5/2008 | Biggs ................... G06F 40/279 709/206 |
| 2008/0139112 | A1 | 6/2008 | Sampath et al. |
| 2008/0281687 | A1 | 11/2008 | Hurwitz et al. |
| 2009/0055267 | A1 | 2/2009 | Roker |
| 2009/0076798 | A1 | 3/2009 | Oh et al. |
| 2009/0287678 | A1 | 11/2009 | Brown et al. |
| 2010/0042470 | A1 | 2/2010 | Chang et al. |
| 2010/0091971 | A1 | 4/2010 | Famous |
| 2011/0035280 | A1 | 2/2011 | Fordyce et al. |
| 2011/0173071 | A1 | 7/2011 | Meyer et al. |
| 2011/0246910 | A1 | 10/2011 | Moxley et al. |
| 2011/0283190 | A1 | 11/2011 | Poltorak |
| 2012/0081506 | A1 | 4/2012 | Marvit |
| 2012/0109753 | A1 | 5/2012 | Kennewick et al. |
| 2012/0278073 | A1 | 11/2012 | Weider et al. |
| 2013/0036009 | A1 | 2/2013 | Heiser et al. |
| 2013/0054433 | A1 | 2/2013 | Giard et al. |
| 2013/0060587 | A1 | 3/2013 | Bayrak et al. |
| 2013/0124189 | A1 | 5/2013 | Baldwin |
| 2013/0297471 | A1 | 11/2013 | Gaskell |
| 2013/0311270 | A1 | 11/2013 | Daftary et al. |
| 2014/0038578 | A1 | 2/2014 | Bouzid et al. |
| 2014/0244359 | A1 | 8/2014 | Haber et al. |
| 2014/0277735 | A1 | 9/2014 | Breazeal |
| 2016/0140320 | A1 | 5/2016 | Moturu et al. |
| 2016/0180735 | A1 | 6/2016 | Clark et al. |
| 2016/0226813 | A1* | 8/2016 | Cecchi ................ H04L 12/1895 |
| 2016/0232201 | A1 | 8/2016 | Goran et al. |
| 2017/0026514 | A1* | 1/2017 | Dwyer ................... G06F 40/30 |

FOREIGN PATENT DOCUMENTS

| | | |
|---|---|---|
| EP | 0781024 A2 | 6/1997 |
| EP | 2234380 A1 | 9/2010 |
| JP | 2004259238 A | 9/2004 |
| JP | 2006061632 A | 3/2006 |
| JP | 5495968 B2 | 5/2014 |
| WO | 2011088053 A2 | 7/2011 |
| WO | 2012064999 A1 | 5/2012 |
| WO | 2015023546 A1 | 2/2015 |
| WO | 2016077697 A1 | 5/2016 |

OTHER PUBLICATIONS

List of IBM Patents or Patent Applications Treated as Related.

Sahay et al., "Cobot: Real Time Multi User Conversational Search and Recommendations", Recommender Systems and the Social Web, 2009, vol. 532, CEUR Workshop Proceedings.

* cited by examiner

SYSTEM AND METHOD FOR COGNITIVE INTERVENTION ON HUMAN INTERACTIONS

CROSS REFERENCE TO RELATED APPLICATIONS

The present application is a continuation of, and claims the benefit of priority of, U.S. patent application Ser. No. 15/398,029, filed Jan. 4, 2017, titled "System and Method for Cognitive Intervention on Human Interactions" the entire contents of which are incorporated herein by reference.

FIELD OF THE INVENTION

The present invention relates to system-generated assistance in dialog systems.

BACKGROUND OF THE INVENTION

Automated dialog systems are used to provide assistance and information in a computing environment. Examples of automated dialog systems include personal assistant solutions such as Siri from Apple, Inc., Google Now and Microsoft Cortana. These personal assistant solutions return information to a user promptly upon request using voice-oriented dialog technology. In this context, particular computational components (or bots) integrated to either a voice-oriented or text-based dialog system can be programmed to provide assistance and information upon the detection of certain situations, conditions or events in the communication, e.g., in Slack a preconfigured bot user may show a link about 'agile' when a user message contains this word. Most voice or text activated assistance systems provide information based on user-initiated request, i.e., like Apple Siri. Alternatively, requests can be system-initiated, e.g., Slack bots or combination of system-initiated and user-initiated, e.g., Google Allo.

For system-initiated requests, unsolicited assistance and information, while valuable, is delivered to users as soon as the system detects a need and computes such unsolicited assistance and information. The traditional systems that generate unsolicited assistance and information do not take into account the flow of an ongoing discourse or conversation among involved parties or whether the unsolicited assistance and information can in fact disrupt the ongoing conversation. Therefore, automated dialog systems are desired that provide system-initiated assistance and information while limiting the adverse effects of unsolicited assistance and information.

SUMMARY OF THE INVENTION

Exemplary embodiments are directed to cognitive systems with dialog and system-initiated assistance and information generation capabilities and to methods for using these cognitive systems. Exemplary embodiments include a method and apparatus for cognitive dialogs that facilitates the delivery of valuable information and data, e.g., information and data that make a dialog more productive by providing a suggestion or avoiding a conflicting situation, during an ongoing dialog without an explicit request from a user or dialog participant. A given dialog can include two or more users or participants. To minimize undesired effects on an ongoing dialog resulting from unsolicited interventions into the ongoing dialog, an intervention index is determined before potential assistive information or data are communicated to the dialog participants. Therefore, potential assistive information or data are identified by the cognitive system for a given situation within an ongoing dialog. Then, the intervention index is determined by computing the intervention cost which reflects the impact on the ongoing dialog of intervening in the dialog to communicate the potential assistive information or data versus the value of the potential assistive information or data to the ongoing dialog or to the participants in the ongoing dialog. An example of the value of the potential assistive information is critical information.

Exemplary embodiments consider dialog and participant specific parameters in order to determine the intervention index, the intervention cost and the value of the potential assistive information. These dialog and participant specific parameters include, but are not limited to, the context and dynamics of the dialog, e.g., taking turns in the dialog or doing interventions based on opportunities provided between participant turns in the dialog, user data, e.g., participant profiles, emotional profile of a participant and historical data from previous conversations involving one or more of the participants, and the available hardware and software resources, e.g., mobile phones, tablet computers, and computer-based or cloud based graphical displays and environments. Therefore, exemplary embodiments balance the value of information against the desired dialog experience to deliver assistive information in a most efficient and least intrusive way.

Exemplary embodiments can be applied to different types of dialogs including dialogs to schedule a business trip and dialogs related to an appointment with a health care professional. These dialogs can involve interactions or communications between two or more participants. In these conversations a lack of access to right resources, a lack of contextualized information and unexpressed emotions, among other issues, can compromise the effectiveness and productivity of the communication, potentially leading to sub-optimal decisions. For example, in a dialog to schedule a business trip, the potential assistive information relates to the forecast of a heavy snow at the destination and on the day of the business trip, and the participants are unaware of this forecast. In determining the intervention index, the value of the snow storm forecast information is high, i.e., it is necessary to avoid a potentially risky or hazardous situation. Given the very high value of this information, this high level outweighs the intervention cost on the ongoing dialog. Therefore, the intervention index is determined that the forecast should be delivered immediately despite the disruption it may cause in the ongoing dialog. Having decided that the intervention index justifies intervention, a determination is then made regarding the best delivery method. This determination considers the participants to which the information is to be delivered and the available delivery mechanisms. Regarding the weather forecast, this information should be delivered to all participants in the dialog. Since the participants are interacting through a common environment, e.g., a conference call or video conference, the audio and video capabilities of this common environment are identified as a mechanism to communicate the forecast information to all of the participants. The result of the intervention to communicate the weather forecast is a rescheduling of the business trip to a day or location with an improved forecast.

In a dialog relating to an appointment with a health care professional, the dialog in particular relates to an appointment with a physician for the purposes of evaluation, diagnosis and treatment, e.g., the prescription of medication. The potential assistive information is a potential interaction between a drug to be prescribed to the patient and another drug that the patient is already taking. The physician is unaware of this interaction. Again, the information on potential adverse drug interactions is highly valuable, and this value outweighs any adverse effects that intervention could cause on the dialog between the physician and the patient. The intervention index determination, therefore, indicates that the potential assistive information should be communicated. Therefore, the valuable assistive information, i.e., a health risk, should be delivered immediately despite the disruption it may cause in the dialog. A determination is then made regarding the delivery mechanism. The participants to whom the information should be delivered are limited to the physician. The mechanisms available to communicate the potential drug intervention information only to the physician include a tablet computer that the physician is using to enter diagnostic information and the prescribed information. The result of this intervention is the prescription of an alternative medication.

Exemplary embodiments are directed to method for intervening in a dialog to provide system-initiated assistive information. A dialog between at least two participants is monitored, and data from a dialog environment containing at least one of the participants are captured. The captured data include at least one of content of the dialog and physiological data for one or more participants. In one embodiment, data capture devices disposed in the dialog environment are used to monitor the dialog and to capture data. Suitable data capture devices include, but are not limited to, still cameras, video cameras, microphones, telephone equipment, telephone conferencing equipment, video conference equipment, telephones, cellular telephones, smartphones, tablet computers, electronic mail applications, text message applications, thermostats, thermometers, motion sensors, physiological sensors, activity sensors, biomedical sensors and combinations thereof.

Assistive information relevant to the dialog and participants is identified. In one embodiment, the captured data are used to identify assistive information. For example, the captured data are used in at least one of static searches and dynamic searches over fixed databases and continuous data streams. In one embodiment, the captured data are used to identify a physical or emotional condition of at least one participant.

The captured data are used to determine an intervention index for delivering the assistive information to one or more participants during the dialog. In one embodiment, a value of the assistive information to the dialog and participants in the dialog is determined, and an intervention cost on the dialog caused by intervening in the dialog to communicate the assistive information is also determined. The value of the assistive information is compared to the intervention cost on the dialog, the system intervenes in the dialog if the value of the assistive information is sufficient to justify the intervention cost on the dialog.

Intervention into the dialog occurs to deliver the assistive information to one or more participants based on the intervention index. In one embodiment, intervention parameters are determined for communicating the assistive information to the one or more participants, and intervention into the dialog occurs in accordance with the intervention parameters. In order to determine the intervention parameters, target participants in the dialog to receive the assistive information are identified, and an appropriate time during the dialog for intervening in the dialog that minimizes interference with the participants is also identified. In addition, intervention mechanisms associated with the target participants that can be used to deliver the assistive information to the target participants are identified. Suitable intervention mechanisms include, but are not limited to, speakers, video monitors, lights, haptic systems, kinesthetic systems, graphical user interfaces, smart phones, tablet computers, telephones, cellular telephones and combinations thereof.

Having intervened in the dialog, post-intervention impacts on the dialog resulting from intervening in the dialog and delivering the assistive information are determined. The post-intervention impacts are used to determine an intervention index of delivering additional assistive information to one or more participants at a later time during the dialog. Determining post-intervention impacts includes analyzing data captured from the dialog and participants after intervening in the dialog to determine the post-intervention impacts of intervening in the dialog to deliver the assistive information. In one embodiment, the post-intervention impacts are associated with at least one of the dialog, a portion of the dialog, a type of dialog, the assistive information, a category of assistive information, a delivery mechanism used to communicate the assistive information and one or more participants. The post-intervention impacts and associations are stored for use in determining the intervention index of delivering additional assistive information to one or more participants at the later time during the dialog.

Exemplary embodiments are also directed to a method for intervening in a dialog to provide system-initiated assistive information where a dialog between at least two participants is monitored and data from a dialog environment containing at least one of the participants are captured. The captured data include at least one of content of the dialog and physiological data for one or more participants. Assistive information relevant to the dialog and participants is identified, and the captured data are used to determine an intervention index for delivering the assistive information to one or more participants during the dialog by determining a value of the assistive information to the dialog and participants in the dialog and determining an intervention cost on the dialog caused by intervening in the dialog to communicate the assistive information.

In one embodiment, using the captured information to determine the intervention index further includes comparing the value of the assistive information to the intervention cost on the dialog, and intervening in the dialog occurs if the value of the assistive information is sufficient to justify the intervention cost on the dialog. In one embodiment, determining the value of the assistive information includes assigning a low value to assistive information comprising a system-generated suggestion, assigning a high value to assistive information comprising a resolution to a conflict occurring among the participants during the dialog and assigning a medium value between the low value and the high value to assistive information comprising an answer to a participant generated question.

In one embodiment, determining the intervention cost on the dialog includes assigning a low intervention cost level when intervening in the dialog elicits a positive reaction from one or more participants, assigning a high intervention cost level when intervening in the dialog elicits a negative reaction from one or more participants and assigning a medium intervention cost level between the low intervention cost level and the high intervention cost level when intervening in the dialog elicits a neutral reaction from one or more participants.

Exemplary embodiments are also directed to a dialog intervention system. The dialog intervention system includes at least one dialog environment containing at least two participants engaged in a dialog and a cognitive system in communication with the at least one dialog environment to monitor the dialog between the at least two participants. The cognitive system includes interface capture modules to capture data from the dialog environment. The captured data are at least one of content of the dialog and physiological data for one or more participants. The cognitive system also includes processing modules to identify assistive information relevant to the dialog and participants and to use the captured data to determine an intervention index for delivering the assistive information to one or more participants during the dialog. Interface presentation modules are included in the cognitive system to intervene in the dialog to deliver the assistive information to one or more participants based on the intervention index.

In one embodiment, data capture devices are located in the dialog environment to monitor the dialog and to capture data. Suitable data capture devices include, but are not limited to, still cameras, video cameras, microphones, telephone equipment, telephone conferencing equipment, video conference equipment, telephones, cellular telephones, smartphones, tablet computers, electronic mail applications, text message applications, thermostats, thermometers, motion sensors, physiological sensors, activity sensors, biomedical sensors or combinations thereof. In one embodiment, the processing modules include an assistive information detection module to use the captured data to identify assistive information. In one embodiment, the assistive information detection module uses the captured data in at least one of static searches and dynamic searches over fixed databases and continuous data streams. In one embodiment, the processing modules use the captured data to identify a physical or emotional condition of at least one participant.

In one embodiment, processing modules include an assistive information value and intervention cost module to determine a value of the assistive information to the dialog and participants in the dialog and to determine an intervention cost on the dialog caused by intervening in the dialog to communicate the assistive information. The assistive information value and intervention cost module compares the value of the assistive information to the intervention cost on the dialog, and the interface modules intervene in the dialog if the value of the assistive information is sufficient to justify the intervention cost on the dialog.

In one embodiment, the processing modules include an intervention delivery module determine intervention parameters for communicating the assistive information to the one or more participants; and the interface modules intervene in the dialog in accordance with the intervention parameters. The intervention delivery module identifies target participants in the dialog to receive the assistive information. The processing modules include an intervention opportunity analysis module to identify an appropriate time during the dialog for intervening in the dialog that minimizes interference with the participants, and the dialog environment includes intervention mechanisms associated with the target participants and in communication with the interface modules that can be used to deliver the assistive information to the target participants. Suitable intervention mechanisms include, but are not limited to, speakers, video monitors, lights, haptic systems, kinesthetic systems, graphical user interfaces, smart phones, tablet computers, telephones, cellular telephones and combinations thereof.

In one embodiment, the processing modules include an intervention result analysis module to determine post-intervention impacts on the dialog resulting from intervening in the dialog and delivering the assistive information and to use the post-intervention impacts to determine an intervention index for delivering additional assistive information to one or more participants at a later time during the dialog. In one embodiment, the intervention result analysis module analyzes data captured from the dialog and participants after intervening in the dialog to determine the post-intervention impacts of intervening in the dialog to deliver the assistive information. In another embodiment, the intervention result analysis module associates the post-intervention impacts with at least one of the dialog, a portion of the dialog, a type of dialog, the assistive information, a category of assistive information, a delivery mechanism used to communicate the assistive information and one or more participants and stores the post-intervention impacts and associations for use in determining the intervention index for delivering additional assistive information to one or more participants at the later time during the dialog.

Exemplary embodiments are also directed to a dialog intervention system that contains at least one dialog environment containing at least two participants engaged in a dialog and a cognitive system in communication with the at least one dialog environment to monitor the dialog between the at least two participants. The cognitive system includes interface capture modules to capture data from a dialog environment containing at least one of the participants. The captured data are at least one of content of the dialog and physiological data for one or more participants. The cognitive system also includes processing modules in communication with the interface capture modules. The processing modules include an assistive information detection module to identifying assistive information relevant to the dialog and participants and an assistive information value and intervention cost analysis module to use the captured data to determine a value of the assistive information to the dialog and participants in the dialog and to determine an intervention cost on the dialog caused by intervening in the dialog to communicate the assistive information in order to determine an intervention index for delivering the assistive information to one or more participants during the dialog.

In one embodiment, the assistive information value and intervention cost analysis module compares the value of the assistive information to the intervention cost on the dialog, and the cognitive system includes interface presentation modules to intervene in the dialog if the value of the assistive information is sufficient to justify the intervention cost on the dialog. In one embodiment, the assistive information value and intervention cost analysis module assigns a low value to assistive information comprising a system-generated suggestion, assigns a high value to assistive information comprising a resolution to a conflict occurring among the participants during the dialog and assigns a medium value between the low value and the high value to assistive information comprising an answer to a participant generated question. In one embodiment, the assistive information value and intervention cost analysis module assigns a low intervention cost level when intervening in the dialog elicits a positive reaction from one or more participants, assigns a high intervention cost level when intervening in the dialog elicits a negative reaction from one or more participants and assigns a medium intervention cost level between the low intervention cost level and the high intervention cost level when intervening in the dialog elicits a neutral reaction from one or more participants.

In one embodiment, the processing modules include an intervention result analysis module to determine post-intervention impacts on the dialog resulting from intervening in the dialog and delivering the assistive information and to use the post-intervention impacts to determine an intervention index for delivering additional assistive information to one or more participants at a later time during the dialog. In one embodiment, the intervention result analysis module associates the post-intervention impacts with at least one of the dialog, a portion of the dialog, a type of dialog, the assistive information, a category of assistive information, a delivery mechanism used to communicate the assistive information and one or more participants and stores the post-intervention impacts and associations for use in determining the intervention index for delivering additional assistive information to one or more participants at the later time during the dialog.

DETAILED DESCRIPTION

Figure 1:
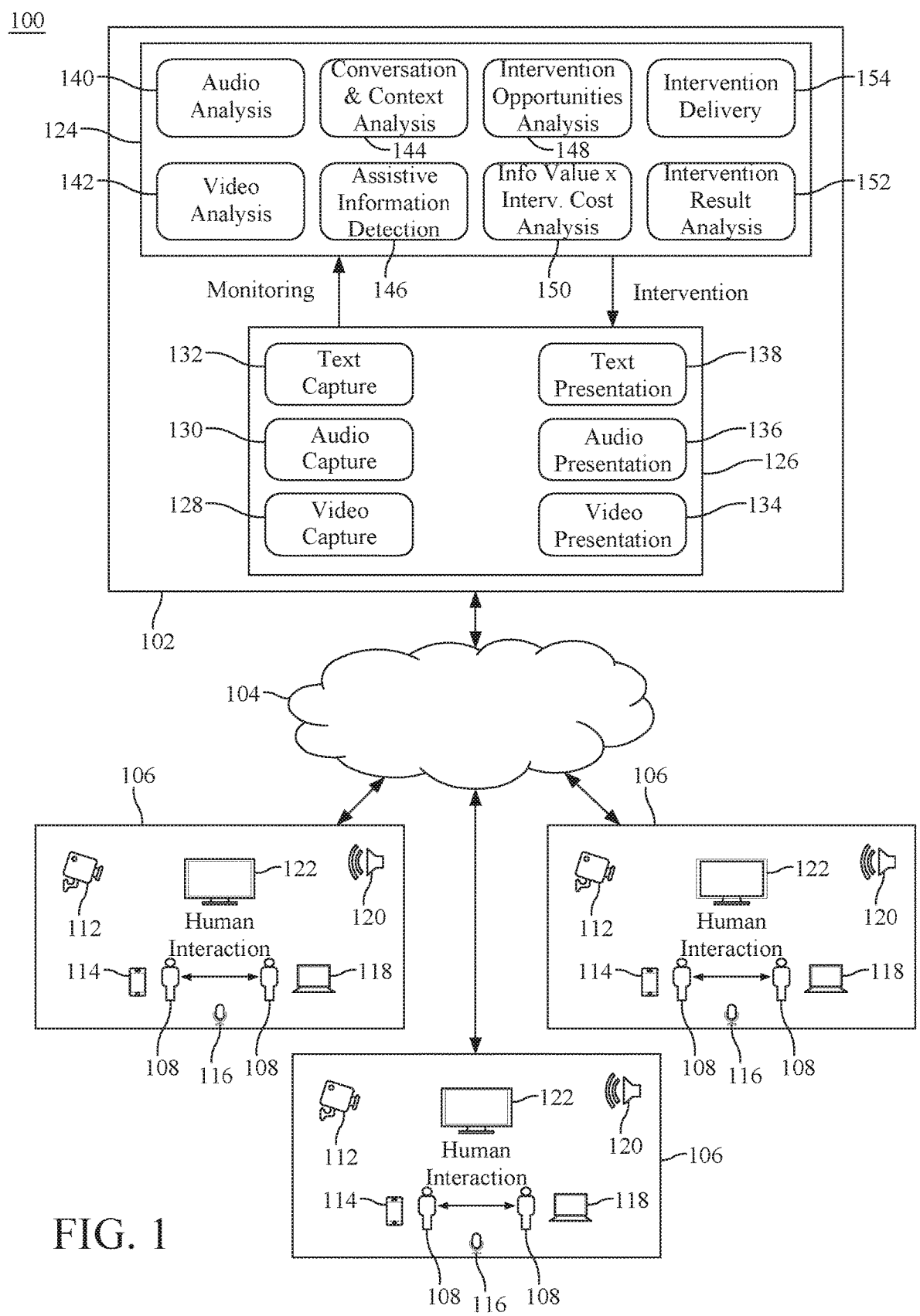
FIG. 1 is a schematic representation of an embodiment of a cognitive system for use in intervening in a dialog to provide system-initiated assistive information.

Exemplary embodiments implement a cognitive system or cognitive entity as a passive or monitoring participant in a dialog between two or more participants. The cognitive system monitors information and communications exchange among the active participants in the dialog to identify the need for relevant and valuable assistive information. The cognitive system then determines both when and how to deliver this assistive information to the appropriate participant or participants in the least intrusive manner. Monitoring of ongoing dialogs includes, but is not limited to, monitoring audio and visual information and text exchanged among the participants. The exchanged audio, visual and text include verbal communications, video, pictures, text messages and sensor data. In general, any information that can capture accurately the context of the dialog, e.g., recognize participants through facial recognition technology, identify emotions of participants, identify behaviors of participants and identify environmental conditions, is monitored.

The assistive information is system-identified and is not explicitly requested by an active participant or pre-determined by the system. Instead, the assistive information is identified on-the-fly in real-time based on the monitored context of the dialog and the participants in that dialog. Therefore, the identified assistive information is valuable information within the context of the ongoing dialog. To minimize intervention cost associated with interrupting a dialog by communicating the assistive information, the intervention index on the interaction flow among the participants is determined. The decision on whether and when to present the assistive information to one or more participants in the dialog is based on the determined intervention index, which is based on a balance or trade-off between the value of the assistive information to the dialog or the participants in the dialog and the intervention cost on the dialog of intervening to communicate the assistive information. When the determined intervention index indicates that intervention is preferred, then a determination is made regarding which participants are to receive the assistive information and the mechanism to deliver the assistive information. The mechanism to deliver the assistive information considers the available mechanisms to communicate the assistive information to the targeted participants, selecting the best delivery mechanism. The assistive information is then delivered to the targeted participants at the most appropriate moment using the selected delivery mechanism. The result of the intervention is then monitored and assessed. Future interventions can take into account the results of previous interventions.

Exemplary embodiments analyze the trade-off between the benefit of the assistive information versus the cost of disruption in the communication flow, i.e., the intervention cost. In addition, context analysis relative to the dialog is used to identify the best delivery mechanism and the best moment to communicate the assistive information to any subset of targeted participants. Embodiments of the cognitive system can be configured as a stand-alone dialog system with system-initiated assistance. Alternatively, the cognitive system is integrated into other cognitive systems such as IBM Watson, Apple Ski, Google Now, Amazon Echo and Microsoft Cortana. This integration supports and enhances the communication among human agents in a shared space, a distributed computing system or a cloud based computing environment.

Exemplary embodiments provided include dialog environments containing instrumentation and equipment such as microphones and cameras to monitor conversations and reactions by capturing audio and video streams. In one embodiment, text is captured from a text based input/output device such as a touch screen or keyboard. The cognitive system monitors the dialog environment using the available data capture mechanisms to obtain data for the ongoing dialog. The dialog environment also includes the delivery mechanisms to deliver the assistive information to one or more dialog participants. These delivery mechanisms include, but are not limited to, graphical user interfaces, video monitors, speakers, cellular phones, smartphones, tablet computers, telephone equipment including conferencing equipment and public address systems.

Exemplary embodiments of the cognitive system include computing systems and modules that provide the analytical and computational components to analyze the dialog, identify assistive information, determine the intervention index, predict the most appropriate moment to make the intervention and how to deliver the assistive information to any subset of targeted participants. Suitable computing systems include, but are not limited to, distributed computing systems and cloud based computing systems that can be deployed on a cloud platform. These analytical and computational components process the data from the monitored dialog environment and generate an intervention to deliver assistive information that is relevant for the ongoing dialog. In addition, the analytical and computational components analyze the context of the dialog to determine if an intervention should be conducted, when the intervention should be conducted and how to deliver and conduct the intervention.

Exemplary embodiments include a method for providing cognitive system-initiated assistive information and data to a dialog between at least two participants. The dialogs include any setting in which information is exchanged through any available mechanism between two or more active participants. The active participants include human participants and automated or machine participants. Suitable dialogs include, but are not limited to, voice communications, conversations, video conferences, live and in-person meetings, text message exchanges, telephone conferences, lectures, debates, television broadcasts, customer service calls, technical support sessions and combinations thereof. Each location of one or more participants in the dialog is a dialog environment.

The dialog between the two or more participants is monitored by the cognitive system. In one embodiment, data capture devices in at least one dialog environment containing at least one participant are used to monitor the dialog exchanges and the dialog participants during the dialog. Alternatively, data capture devices in a plurality of dialog environments or for a plurality of participants in one or more dialog environments are used. Suitable data capture devices include, but are not limited to, still cameras, video cameras, microphones, telephone equipment, telephone conferencing equipment, video conference equipment, telephones, cellular telephones, smartphones, table computers, electronic mail applications, text message applications, thermostats, thermometers, motion sensors, physiological sensors, activity sensors, biomedical sensors and combinations thereof. The data capture devices can be used in combination with software applications that can process the monitored data such as facial recognition applications, voice recognition applications and optical character recognition applications.

The data capture devices are used to obtain or capture data and information related to at least one of the content or context of the dialog and the status or physical condition of the participants. The status and physical condition of the participants covers the emotional state of the participants, e.g., angered, nervous, agitated, and the focus of the participants, e.g., distracted, fatigued, bored. Features from the captured data are extracted to identify potential opportunities for assistive information intervention. In addition, the captured data, e.g., audio, video and text data, are analyzed to identify potential assistive information and data that are relevant to the dialog and the participants in the dialog. For example, the captured data can be used to conduct static searches and dynamic searches over fixed databases and continuous data streams. These searches can cover any source of information including databases and web-sites. In addition, the capture data can be used to derive the status or physical condition of the participants. For example, emotion can be derived from audio or video data or from biomedical sensors such as galvanic skin response sensors.

Having identified relevant assistive data for the monitored, a determination is made regarding whether or not to intervene into the dialog to provide the assistive information. In order to make this determination, an intervention index is evaluated. The intervention index analyzes a tradeoff or balance between the value of the assistive information to the dialog and each of the participants in the dialog and the cost of an intervention on the dialog. Therefore, the intervention cost on the operation, content or progress of the dialog is determined. In addition, the value of the assistive information to the dialog or to one or more participants in the dialog is determined. In one embodiment, profiles and preferences of one or more of the participants are also taken into consideration when determining at least one of the intervention cost on the dialog and the value of the assistive information. In analyzing the tradeoff, assistive information having greater value can balance a higher level of intervention cost on the dialog, while assistive information having lower value will not be shared unless the intervention cost on the dialog is sufficiently low. In one embodiment, a quantitative acceptable intervention index threshold is identified, and a score is associated with the level of intervention cost on the dialog and value of the assistive information. This score is then compared to the acceptable intervention index threshold, and assistive information having a score that is less than or equal to the acceptable intervention index threshold are identified for intervention.

If the assistive information is identified for intervention based on the intervention index, then the intervention parameters for the assistive information or data are identified. The intervention parameters include an identification of the participant or participants to receive the assistive information, an identification of the delivery mechanism used to communicate the assistive information and an appropriate time to intervene in the dialog to deliver the assistive information. In general, the intervention parameters are selected to minimize intrusiveness and disruption to the dialog, to limit the distribution of the assistive information to those participants for which it is necessary or desired, and to maximize the efficacy of the assistive information being delivery to the desired participants. In one embodiment, available delivery mechanisms are identified. Preferably, delivery mechanisms are identified that are associated with the participants targeted to receive the assistive information. Suitable delivery mechanisms include, but are limited to, speakers, video monitors, lights, haptic or kinesthetic systems, graphical user interfaces, smart phones, tablet computers, telephones including cellular telephones and combinations thereof.

Having identified the intervention parameters, intervention into the dialog is accomplished by delivering the assistive information to the targeted participants using the selected delivery mechanisms at the appropriate time. Monitoring of the dialog and capturing of data related to the content of the dialog and condition of the participants continues after the assistive information is delivered. Data capture during the continued monitoring is analyzed to determine that post-intervention impacts or results of the intervention into the dialog and delivery of the assistive information. The post-intervention impacts look for actual changes in the dialog or participants in response to the delivered assistive information, changes in the content or progress of the dialog and changes in the condition or status of the participants. These post-intervention impacts can be associated with the dialog or any part of it, with the type of dialog, with the assistive information or type of assistive information, with the delivery mechanisms and with the participants in the dialog. The post-intervention impacts and any associations are then stored to be used in subsequent intervention determinations, intervention index determinations and intervention parameter determinations.

Referring initially to FIG. 1, exemplary embodiments are directed to a dialog intervention system 100 for intervening in dialogs to provide system-initiated assistive information to the participants in the dialogs. The dialog intervention system includes a cognitive system 102 that is in communication with a dialog being conducted between two or more participants 108 located in one of more dialog environments 106. A given dialog can include two or more participants located at one or more dialog environments. Each dialog environment includes a plurality of data capture devices such as video cameras 112, microphones 116, computers 118 and smart phones 114 or text message enabled devices. Each dialog environment also includes a plurality of intervention mechanisms such as smart phones 114, speakers 120, computers 118 and video monitors 122. Some devices in the dialog environment can function as both data capture devices and intervention mechanisms. Each dialog environment and in particular the data capture devices and intervention mechanisms are in communication with the cognitive system through one of more local or wide area networks 104.

The cognitive system can be executing one or more computing systems including distributed computing systems and cloud based computing systems. The cognitive system includes at least one logical processor executing software programs stored in databases on one or more hardware memories. Therefore, the cognitive system includes a plurality of modules that provide the desired functions of the cognitive system. These modules include interface modules 126 to monitor and capture data from the dialog environments containing the participants. These interface modules are interface capture modules including a text capture module 132 for capturing text based information, an audio capture module 130 for capturing audio data such as live conversations and a video capture module 128 for capturing still pictures and video of the dialog environment. The interface modules are also interface presentation modules including a text presentation module 138 for delivering text based assistive information, an audio presentation module 136 for delivering audio based assistive information and a video presentation module 134 for delivering pictures and video based assistive information.

In addition, the modules include processing modules 124 to analyze the captured data, identify relevant assistive information, determine whether intervention should occur and establish the parameters of that intervention. All of the processing modules are in communication with the interface modules. In one embodiment, the interface modules 126 are part of an instrumented environment, and the processing modules 124 are provided in a cloud environment. The processing modules include an audio analysis module 140 to analyze sounds and conversations in the dialog environment for dialog context and for emotions or physical status of the participants. A video analysis module 142 is provided to analyze pictures, including pictures of participants, objects and text, and video from the dialog environment for dialog context and emotions and physical status of the participants. A dialog or conversation and context analysis module 144 receives the analysis of the audio and video analysis modules and any other inputs such as text inputs. The conversation and context analysis module then uses the captured and analyzed data to determine the context and content of the dialog and to identify the physical and emotional conditions of the participants. The context and content of the dialog and physical and emotional conditions of the participants are communicated to an assistive information detection module 146, which can use this communicated information to search sources of data for assistive information relevant to the dialog and the participants.

An intervention opportunities analysis module 148 also receives the captured and analyzed data and follows the dialog to identify opportunities within the dialog to intervene in the dialog such that negative effects on the dialog and participants are minimized. For example, the intervention opportunities analysis modules identify alternating patterns of speech among the participants and breaks within the patterns of speech during which an intervention can occur. An assistive information value and intervention cost module 150 receives input from the assistive information detection module and intervention opportunities analysis module. The assistive information and intervention cost module may also have profile and preference information from the participants and post-intervention impacts information from previous interventions. All of this information is used to determine an intervention index of delivering the assistive information to one or more participants during the dialog. The intervention index is determined by calculating a value of the assistive information to the dialog and participants in the dialog and an intervention cost on the dialog caused by intervening in the dialog to communicate the assistive information. The values can then be compared to provide the intervention index.

The intervention index is communicated to an intervention delivery module 154, which intervenes in the dialog to communicate the assistive information if the intervention index indicates that the value of the assistive information is sufficient to justify the level of intervention cost on the dialog. In addition, the intervention delivery module can use input from the intervention opportunities analysis module, profiles of the participants and knowledge of the delivery mechanisms in the dialog environments to identify target participants to receive the assistive information, delivery mechanisms associated with the target participants to use in communicating the assistive information and a time to intervene in the dialog to communicate the assistive information. An intervention result analysis module 152 continues to monitor captured and analyzed data from the dialog following the intervention to determine post-intervention impacts on the dialog resulting from intervening in the dialog and delivering the assistive information. The post-intervention impacts are communicated to other processing modules so that the post-intervention impacts can be used to determine intervention index of delivering additional assistive information to one or more participants at a later time during the dialog. In one embodiment, the intervention and result analysis module associates the post-intervention impacts with at least one of the dialog, a type of dialog, the assistive information, a category of assistive information, intervention parameters, and delivery mechanisms used to communicate the assistive information and one or more participants. The post-intervention impacts and generated associations are then stored for access by other processing modules and determining the intervention index of delivering additional assistive information to one or more participants at the later time during the dialog.

Figure 2:
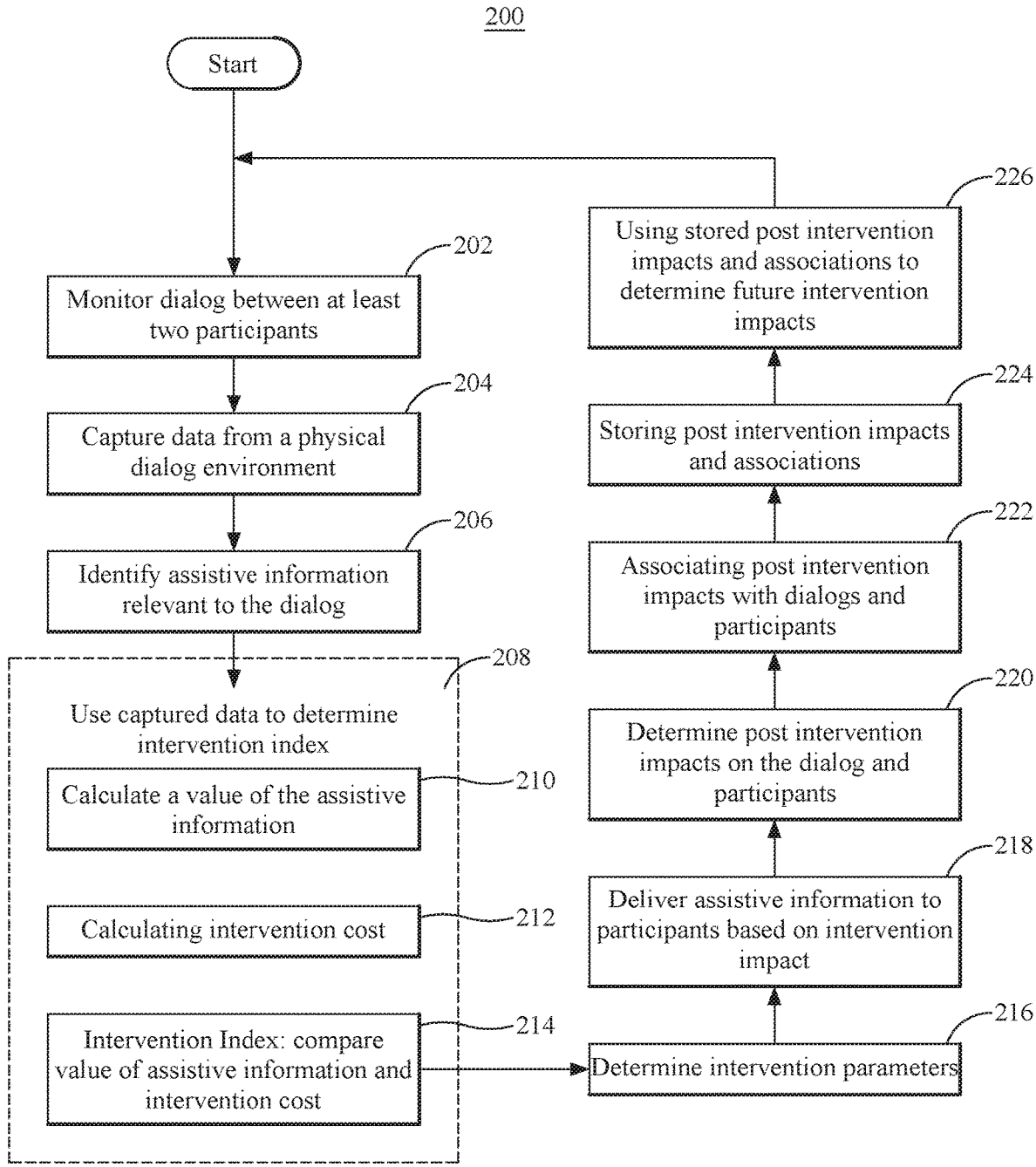
FIG. 2 is a flow chart illustrating an embodiment of a method for intervening in a dialog to provide system-initiated assistive information.

Referring now to FIG. 2, exemplary embodiments are also directed to a method for intervening in a dialog to provide system-initiated assistive information 200. A dialog between at least two participants is monitored 202. Suitable dialogs include any communication of audio, video and textual information among two or more participants. Data from a dialog environment containing at least one of the participants are captured. The participants can all be located in a single dialog environment, e.g., a single room, or can be located in a plurality of different dialog locations. Therefore, each dialog location can include one or more participants. In addition to physical locations, the dialog environment can be virtual locations or virtual environments. The captured data include at least one of content of the dialog and physiological data for one or more participants.

In one embodiment, data capture devices located in the dialog environments are used to monitor the dialog and to capture data 204. The dialog environments include both physical dialog environments, i.e., physical locations containing dialog participants and virtual dialog environments. Suitable data capture devices include, but are not limited to, still cameras, video cameras, microphones, telephone equipment, telephone conferencing equipment, video conference equipment, telephones, cellular telephones, smartphones, tablet computers, electronic mail applications, text message applications, thermostats, thermometers, motion sensors, physiological sensors, activity sensors, biomedical sensors and combinations thereof.

Assistive information relevant to the dialog and participants is identified 206. This information can be general information relevant to any type of dialog or to a specific type of dialog. The assistive information can be obtained in advance and stored. Preferably, the assistive information is obtained in real-time and is specific to the dialog and one or more of the participants in the dialog. Therefore, the captured data are used to identify assistive information. In one embodiment, the captured data are used in at least one of static searches and dynamic searches over fixed databases and continuous data streams. This includes web-based searches and searches of websites and proprietary databases.

While the assistive information can be delivered directly to the dialog and the participants, preferably a determination is made regarding whether the assistive information should be delivered and the best time and methods for delivering the assistive information. Therefore, the captured data are used to determine an intervention index of delivering the assistive information to one or more participants during the dialog 208. In one embodiment, the intervention index is determined by calculating a value of the assistive information to the dialog and participants in the dialog 210 and calculating an intervention cost on the dialog caused by intervening in the dialog to communicate the assistive information 212.

Figure 3:
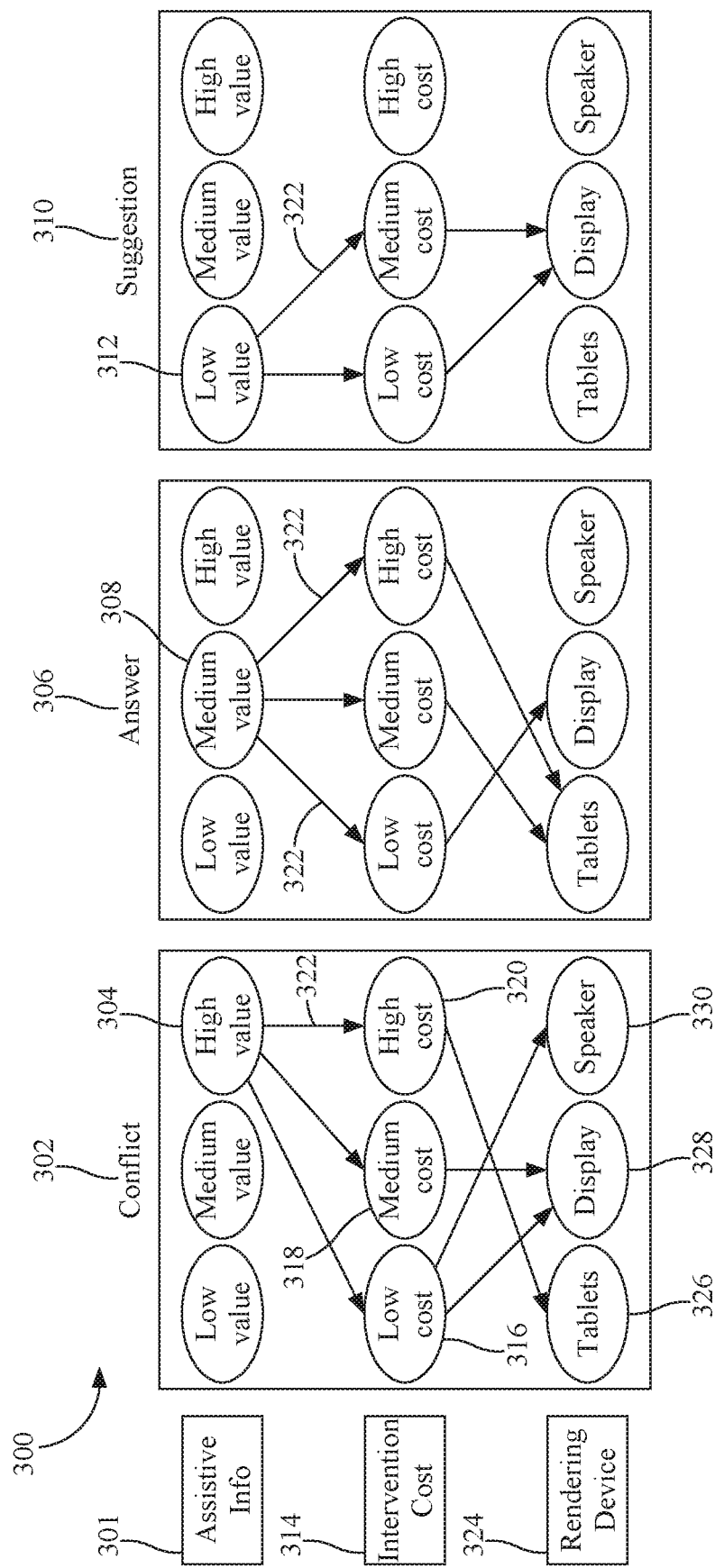
FIG. 3 is a schematic representation of an embodiment of assistive information values and intervention cost levels.

In general, the assistive information value and intervention cost on the dialog are quantified so that they can be compared. For example, the information value and intervention cost can be assigned one of a plurality of discrete quantities or levels based on the type of assistive information and the severity of the intervention cost on the dialog. In one embodiment, three levels are used for the value of the assistive information, and three levels are used for the intervention cost on the dialog. Referring to FIG. 3, the assistive information 301 is quantified based on the type 300 of assistive information or the dialog context or event that motivated the system-initiated assistive information to be generated. Three types of assistive information are illustrated; however, more than three types can be used. Each type has an associated value level. The first type of assistive information is assistive information generated in response to and resolution of a conflict 302 (calendar conflict, weather alert, drug interaction) occurring among participants in the dialog. This type of assistive information is assigned a high value 304. The second type of assistive information is a system-generated suggestion 310 (restaurant, hotel, activity), which is assigned a low value 312. The third type of assistive information contains answers 306 to participant generated questions, whether or not these questions are directed to cognitive system, as the cognitive system is a passive monitor of the dialog. Answer-type assistive information is assigned a medium value 308 between the low value and the high value.

The cost on the dialog caused by the intervention can be expressed as intervention costs 314. The same number of discrete intervention costs as the levels of assistive information values can be used. Alternatively, a different number of levels of intervention costs can be used. In one embodiment, three intervention cost levels are used, a low intervention cost level 316, a high intervention cost level 320 and a medium intervention cost level 318 between the low intervention cost level and the high intervention cost level. In one embodiment, a low intervention cost level 316 is used when intervening in the dialog elicits a positive reaction from one or more participants. A high intervention cost level is assigned when intervening in the dialog elicits a negative reaction from one or more participants. The medium intervention cost level between the low intervention cost level and the high intervention cost level is assigned when intervening in the dialog elicits a neutral reaction from one or more participants. In one embodiment, the captured data can be used to identify a physical or emotional condition of at least one participant. This can be used to identify participant reactions, value of assistive information and intervention cost on the dialog. The assignment or quantification of values and levels to the assistive information and intervention cost on the dialog facilitates comparisons 322 for the purpose of determining the intervention index.

Returning to FIG. 2, the value of the assistive information is compared to the intervention cost level on the dialog of intervening on the dialog to communicate the assistive information 214. In order to intervene into the dialog to communicate the assistive information, intervention parameters for communicating the assistive information to the one or more participants are determined 216. The assistive information is then delivered to the dialog and participants 218 by intervening in the dialog to deliver the assistive information to one or more participants based on the intervention index. In one embodiment, intervention into the dialog happens if the value of the assistive information is sufficient to justify the intervention cost on the dialog. Intervention into the dialog then occurs in accordance with the intervention parameters.

In order to determine the intervention parameters, target participants in the dialog to receive the assistive information are identified. This can be all of the participants, a subset of participants or a single participant. In addition, an appropriate time during the dialog for intervening in the dialog is identified that minimizes interference with the participants. Timing of the intervention takes into account, the flow of the dialog including when each participant is speaking or entering data and pauses or breaks in the dialog or conversation. For example, an analysis of speech patterns in a conversation can indicate if a participant is making a statement or asking a question. This analysis can be used to determine when that participant is likely to stop talking before another participant begins talking. In one embodiment, an interruption objective function is determined for each participant that takes into account not only the relevance and value of the assistive information but also turn-taking rules and several other aspects like culture, hierarchy, relationship of the speakers, participant profiles and emotional states.

Intervention mechanisms associated with the target participants are identified that can be used to deliver the assistive information to the target participants. Suitable intervention mechanisms include, but are not limited to, speakers, video monitors, lights, haptic systems, kinesthetic systems, graphical user interfaces, smart phones, tablet computers, telephones, cellular telephones and combinations thereof. Referring again to FIG. 3, the intervention mechanisms or rendering devices 324 can be selected based on a combination of the value of the assistive information, the intervention cost level on the dialog and the target participants. For example, high value assistive information justifies intervention for all intervention cost levels on the dialog. If the intervention cost on the dialog is high or the assistive information is targeted to a single participant, then a less intrusive intervention mechanism or an intervention mechanism associated with that single participant is utilized, e.g., a table computer 326. For high value assistive information having a medium intervention cost on the dialog or targeted to multiple participants, one or more displays 328 are used to deliver the assistive information. High value information with a low intervention cost on the dialog is delivered using displays and speakers 330, i.e., devices that can quickly and readily reach the desired participants. The assistive information values and intervention cost levels on the dialog can also be used to calculate a quantified overall intervention index. This overall intervention index is then compared to a pre-determined threshold level to determine if intervention into the dialog to deliver the assistive information is justified.

Returning again to FIG. 2, monitoring of the dialog and capturing of the data continues while the dialog continues. Therefore, post-intervention impacts on the dialog resulting from intervening in the dialog and delivering the assistive information are determined 220. In one embodiment, data captured from the dialog and participants after intervening in the dialog are analyzed to determine the post-intervention impacts of intervening in the dialog to deliver the assistive information. The post-intervention impacts are associated with at least one of the dialog, a type of dialog, the assistive information, a category of assistive information, a delivery mechanism used to communicate the assistive information and one or more participants 222. The post-intervention impacts and associations are stored for use in determining the intervention index of delivering additional assistive information to one or more participants at the later time during the dialog 224. This facilitates using the post-intervention impacts to determine intervention index of delivering additional assistive information to one or more participants at a later time during the dialog 226. All of these steps of the method are repeated for the duration of the conversation.

Exemplary embodiments minimize the intrusiveness of the assistive information. The timing and moment of the delivery is based on the trade-off analysis of the benefit, relevance and value of the assistive information versus the cost of disruption in the communication flow during the dialog. In one embodiment, the cognitive system is configured to guarantee the delivery of the assistive information, for example, based on a timeout function when no appropriate time is detected. In addition, the assistive information is delivered to the rendering devices or delivery mechanisms selectively. A context analysis is performed to determine the best delivery approach of the assistive information to the participants. Some assistive information can be presented to all participants while other may be appropriated for presentation to only part of them.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to apparatus (systems) and computer program products according to embodiments of the invention. It will be understood that each description and illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The schematic illustrations and block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, with the possible exception of limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 4:
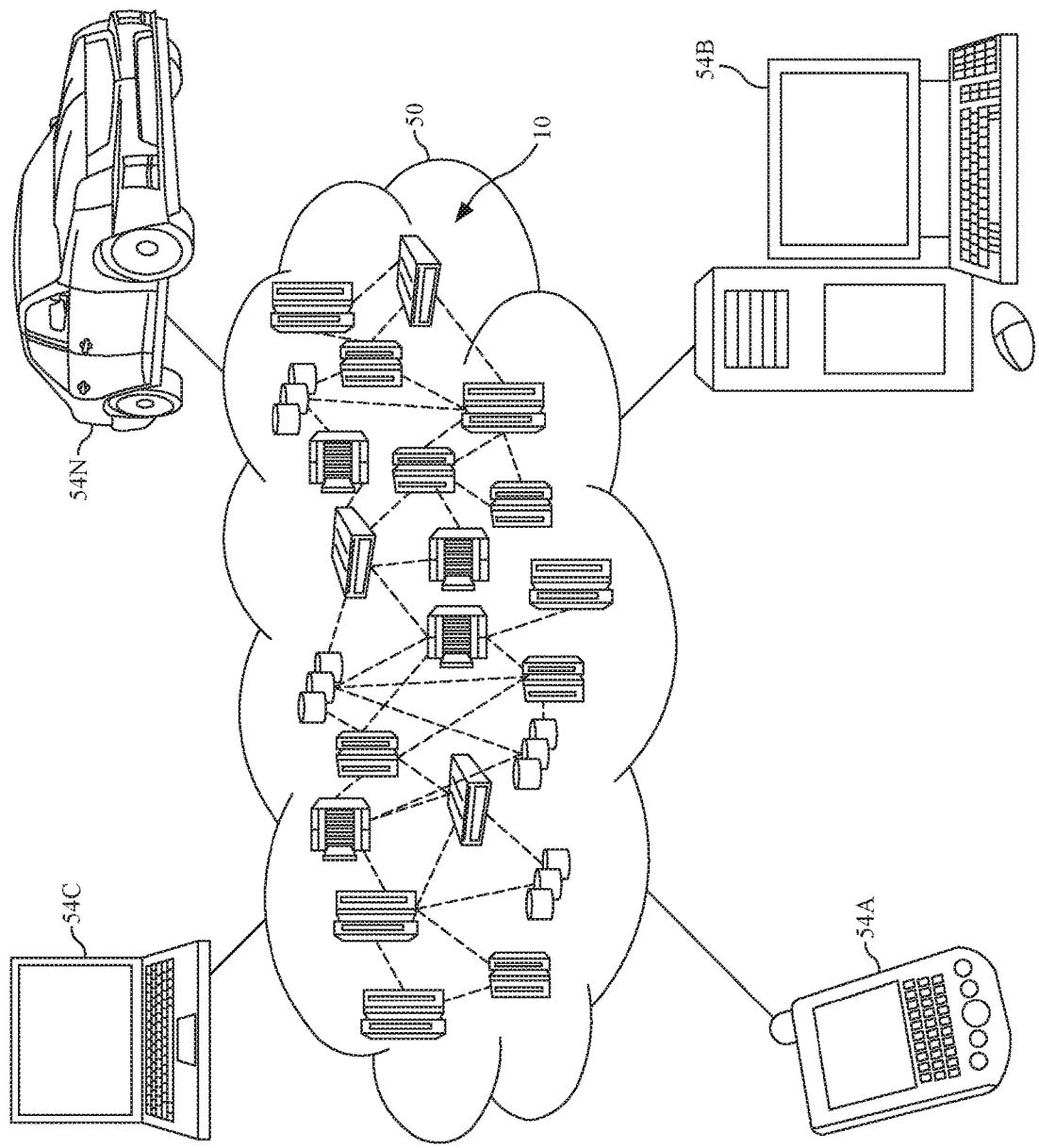
FIG. 4 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 4, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection, e.g., using a web browser.

Figure 5:
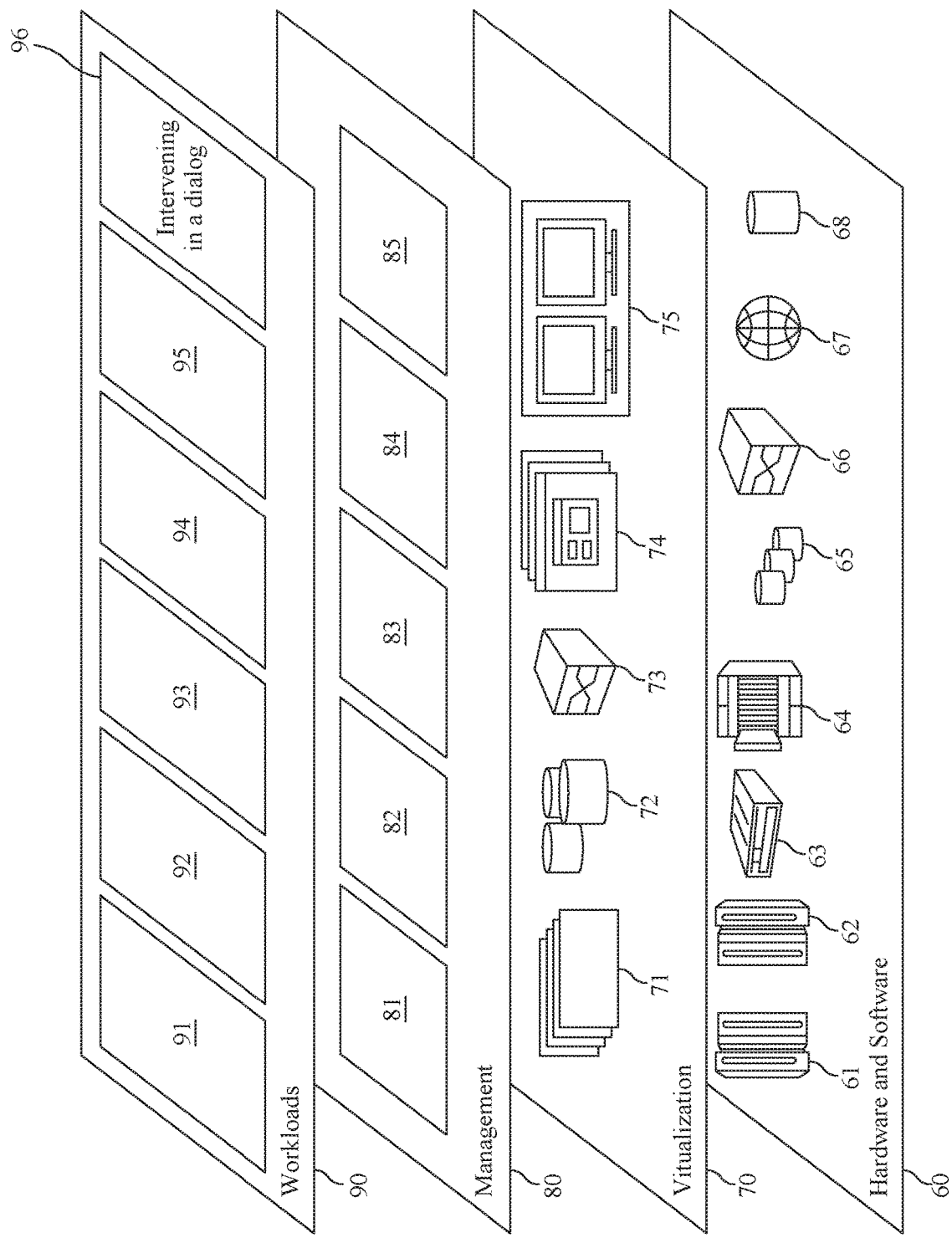
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method intervening in a dialog to provide system-initiated assistive information 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for intervening in a dialog to provide system-initiated assistive information in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A dialog intervention system comprising:
   at least one dialog environment containing at least two participants engaged in a dialog; and
   a cognitive system in communication with the at least one dialog environment to monitor the dialog between the at least two participants, the cognitive system comprising:
   interface capture modules to capture data from the dialog environment, the captured data accurately capturing a context of the dialog and comprising content of the dialog;
   processing modules to identify assistive information valuable within the context of the dialog and to use the captured data to determine an intervention index on an interaction flow among the participants from delivering the assistive information to one or more participants during the dialog, wherein the intervention index comprises a quantification of an intervention cost; and
   interface presentation modules to intervene in the dialog to deliver the assistive information to one or more participants based on the intervention index.

2. The system of claim 1, further comprising data capture devices disposed in the dialog environment to monitor the dialog and to capture data.

3. The system of claim 2, wherein the data capture devices comprise still cameras, video cameras, microphones, telephone equipment, telephone conferencing equipment, video conference equipment, telephones, cellular telephones, smartphones, tablet computers, electronic mail applications, text message applications, thermostats, thermometers, motion sensors, physiological sensors, activity sensors, biomedical sensors or combinations thereof.

4. The system of claim 1, wherein the processing modules comprise an assistive information detection module to use the captured data to identify assistive information.

5. The system of claim 4, wherein the assistive information detection module uses the captured data in at least one of static searches and dynamic searches over fixed databases and continuous data streams.

6. The system of claim 1, wherein:
   the captured data further comprise physiological data for one or more participants; and
   the processing modules use the captured data to identify a physical or emotional condition of at least one participant.

7. The system of claim 1, wherein the assistive information value and the intervention cost comprise a plurality of discrete quantities based on a type of assistive information and a severity of the information cost on the dialog.

8. The system of claim 1, wherein:
   the processing modules comprise an intervention delivery module determine intervention parameters for communicating the assistive information to the one or more participants; and the interface modules intervene in the dialog in accordance with the intervention parameters.

9. The system of claim 8, wherein:
   the intervention delivery module identifies target participants in the dialog to receive the assistive information; the processing modules comprise an intervention opportunity analysis module to identify an appropriate time during the dialog for intervening in the dialog that minimizes interference with the participants; and
   the dialog environment comprises intervention mechanisms associated with the target participants and in communication with the interface modules that can be used to deliver the assistive information to the target participants.

10. The system of claim 9, wherein the intervention mechanisms comprise speakers, video monitors, lights, haptic systems, kinesthetic systems, graphical user interfaces, smart phones, tablet computers, telephones, cellular telephones or combinations thereof.

11. The system of claim 1, wherein the processing modules comprise an intervention result analysis module to determine post-intervention impacts on the dialog resulting from intervening in the dialog and delivering the assistive information and to use the post-intervention impacts to determine an intervention index for delivering additional assistive information to one or more participants at a later time during the dialog.

12. The system of claim 11, wherein the intervention result analysis module analyzes data captured from the dialog and participants after intervening in the dialog to determine the post-intervention impacts of intervening in the dialog to deliver the assistive information.

13. The system of claim 11, wherein the intervention result analysis module associates the post-intervention impacts with at least one of the dialog, a portion of the dialog, a type of dialog, the assistive information, a category of assistive information, a delivery mechanism used to communicate the assistive information and one or more participants and stores the post-intervention impacts and associations for use in determining the intervention index for delivering additional assistive information to one or more participants at the later time during the dialog.

14. A dialog intervention system comprising:
   at least one dialog environment containing at least two participants engaged in a dialog; and
   a cognitive system in communication with the at least one dialog environment to monitor the dialog between the at least two participants, the cognitive system comprising:
   interface capture modules to capture data from a dialog environment containing at least one of the participants, the captured data accurately capturing a context of the dialog and comprising content of the dialog;
   processing modules in communication with the interface capture modules, the processing modules comprising:
     an assistive information detection module to identifying assistive information valuable to the context of the dialog; and
     an assistive information value and intervention cost analysis module to use the captured data to determine an intervention index on an interaction flow among the participants from delivering the assistive information to one or more participants during the dialog.

15. The system of claim 14, wherein:
   the assistive information value and intervention cost analysis module compares the value of the assistive information to the intervention cost on the dialog; and
   the cognitive system comprises interface presentation modules to intervene in the dialog if the value of the assistive information is sufficient to justify the intervention cost on the dialog.

16. The system of claim 14, wherein the assistive information value and intervention cost analysis module:
- assigns a low value to assistive information comprising a system-generated suggestion;
- assigns a high value to assistive information comprising a resolution to a conflict occurring among the participants during the dialog; and
- assigns a medium value between the low value and the high value to assistive information comprising an answer to a participant generated question.

17. The system of claim 14, wherein the assistive information value and intervention cost analysis module:
- assigns a low intervention cost level when intervening in the dialog elicits a positive reaction from one or more participants;
- assigns a high intervention cost level when intervening in the dialog elicits a negative reaction from one or more participants; and
- assigns a medium intervention cost level between the low intervention cost level and the high intervention cost level when intervening in the dialog elicits a neutral reaction from one or more participants.

18. The system of claim 15, wherein the processing modules comprise an intervention result analysis module to determine post-intervention impacts on the dialog resulting from intervening in the dialog and delivering the assistive information and to use the post-intervention impacts to determine an intervention index for delivering additional assistive information to one or more participants at a later time during the dialog.

19. The system of claim 18, wherein the intervention result analysis module associates the post-intervention impacts with at least one of the dialog, a portion of the dialog, a type of dialog, the assistive information, a category of assistive information, a delivery mechanism used to communicate the assistive information and one or more participants and stores the post-intervention impacts and associations for use in determining the intervention index for delivering additional assistive information to one or more participants at the later time during the dialog.

* * * * *